(12) United States Patent
Horobin et al.

(10) Patent No.: US 12,368,901 B2
(45) Date of Patent: Jul. 22, 2025

(54) SYSTEM, A DEVICE, AND METHODS OF STREAMING AN EVENT

(71) Applicant: Aircast Holdings Pty Ltd, Moorabbin (AU)

(72) Inventors: Craig Horobin, Sandringham (AU); Sreenivas Chary, Highett (AU); Sanchit Sharma, Point Cook (AU); Chris Dimopoulos, Frankston (AU)

(73) Assignee: Aircast Holdings Pty Ltd, Moorabbin (AU)

( * ) Notice: Subject to any disclaimer, the term of this patent is extended or adjusted under 35 U.S.C. 154(b) by 0 days.

(21) Appl. No.: 18/249,232

(22) PCT Filed: Oct. 14, 2021

(86) PCT No.: PCT/AU2021/051201
§ 371 (c)(1),
(2) Date: Apr. 14, 2023

(87) PCT Pub. No.: WO2022/077066
PCT Pub. Date: Apr. 21, 2022

(65) Prior Publication Data
US 2023/0396814 A1    Dec. 7, 2023

(30) Foreign Application Priority Data

Oct. 15, 2020   (AU) ................................ 2020903742
Aug. 24, 2021   (AU) ................................ 2021221519

(51) Int. Cl.
*H04N 21/2187*   (2011.01)
*H04N 21/234*   (2011.01)
*H04N 21/258*   (2011.01)

(52) U.S. Cl.
CPC ... *H04N 21/2187* (2013.01); *H04N 21/23424* (2013.01); *H04N 21/25816* (2013.01)

(58) Field of Classification Search
CPC ......... H04N 21/2187; H04N 21/23424; H04N 21/25816
See application file for complete search history.

(56) References Cited

U.S. PATENT DOCUMENTS

| 2015/0195611 A1 | 7/2015 | Kim et al. |
| 2017/0195744 A1 | 7/2017 | Engel et al. |

(Continued)

OTHER PUBLICATIONS

"Aircast 20 Simplicity and Functionality"; YouTube, retrieved from the Internet: URL: https://www.youtube.com/watch?v=k61Pxlnlq7A, Aug. 4, 2020.

(Continued)

*Primary Examiner* — Mulugeta Mengesha
(74) *Attorney, Agent, or Firm* — Knobbe, Martens, Olson & Bear, LLP (57) ABSTRACT

There is disclosed a system (10) for streaming an event, comprising: an event stream generator (13) configured to generate an event stream; a user device (19) for use by a user; and a server (18), wherein the event stream generator (13) is further configured to transmit to the server (18) an event stream identifier for identifying the event stream; wherein the server (18) is configured to: store in a database (16) the event stream identifier transmitted from the event stream generator (13) to the server (18); and in response to a request for the event stream identifier by a user, transmit the stored event stream identifier and supplementary content to the user device (19), wherein the user device (19) is configured to: receive from the event stream generator (13) the event stream generated by the event stream generator (13) using the event stream identifier transmitted from the server (18) to the user device (19); and combine the supplementary content transmitted from the server (18) to the user device (19) and the event stream received from the event (Continued)

stream generator (13), for display to the user of the user device (19).

20 Claims, 6 Drawing Sheets

(56) References Cited

U.S. PATENT DOCUMENTS

| | | | |
|---|---|---|---|
| 2018/0255331 A1* | 9/2018 | McLean | H04L 65/1089 |
| 2019/0069047 A1* | 2/2019 | Wood | H04N 21/2187 |
| 2019/0141394 A1 | 5/2019 | Loheide et al. | |
| 2019/0387262 A1 | 12/2019 | Link | |
| 2020/0059687 A1* | 2/2020 | Zane | H04N 21/8106 |
| 2020/0162796 A1* | 5/2020 | Azuolas | H04N 21/4788 |
| 2021/0058656 A1* | 2/2021 | Meng | H04N 21/25858 |

OTHER PUBLICATIONS

International Search Report issued for International Patent Application No. PCT/AU2021/051201, dated Nov. 25, 2021 in 5 pages.

\* cited by examiner

SYSTEM, A DEVICE, AND METHODS OF STREAMING AN EVENT

RELATED APPLICATIONS

This application is the U.S. National Phase under 35, U.S.C. § 371 of International Application PCT/AU2021/051201, filed Oct. 14, 2021, which claims the benefit of the priority of Australian provisional patent application no. 2020903742. The content of Australian provisional patent application no. 2020903742 is incorporated by reference in their entirety.

This application also claims the benefit of the priority of Australian standard patent application no. 2021221519. The content of Australian standard patent application no. 2021221519 is also incorporated by reference in their entirety.

FIELD OF THE INVENTION

The invention is related to a system, a device, and methods of streaming an event, and is especially but not exclusively applicable to streaming a broadcast of a live event in real-time.

BACKGROUND

Live events can be streamed online over the Internet and locally with or without the Internet. There can be multiple streams for a single event. Each stream usually comprises both video and audio captured by a video and audio recorder such as a video camera. Accordingly, there can be multiple video cameras positioned in different locations around an event to capture the event from different perspectives.

A server can be provided to broadcast multiple streams of an event to a plurality of viewers. Typically, the server receives the multiple streams of the event from respective video cameras, before broadcasting one or more of the streams. In order to broadcast more than one stream, different streams can be transmitted in different channels. Alternatively, multiple streams can be combined into a single composite stream by the server before the composite stream is broadcast to viewers.

Also, the server can be used to modify a stream before the stream is broadcast to viewers. For example, supplementary content such as advertisement can be added to a stream before the stream as modified by the addition of the supplementary content is broadcast to viewers. Depending on the implementation, the modified stream may be a modified composite stream. In particular, different supplementary content can be added to different individual streams before the individual streams as modified (by the addition of the respective supplementary content) are combined into a single modified composite stream.

However, using a server can also present certain difficulties. If there are a large number of viewers or streams from an event, there must be sufficient bandwidth or capacity at the server or there may be delay or lag in the broadcast.

Also, the server must have sufficient processing power to cope with generating composite streams by combining individual streams and adding supplementary content to streams, in particular, if the server is to modify different individual streams and then combine the modified individual streams into a single modified composite stream before broadcasting.

There is a need for an improved architecture for streaming broadcasts of live events in real time.

SUMMARY OF THE INVENTION

In a first aspect, the invention provides a method of streaming an event, comprising:
  transmitting an event stream identifier to a server for storage in a database;
  generating by an event stream generator an event stream that is identifiable by the event stream identifier;
  requesting the server for the stored event stream identifier by a user;
  transmitting the stored event stream identifier and supplementary content from the server to a user device of the user;
  receiving from the event stream transmitter the event stream generated by the event stream generator using the event stream identifier transmitted from the server to the user device; and
  combining the supplementary content transmitted from the server to the user device and the event stream received from the event stream generator, for display to the user of the user device.

In a second aspect, the invention provides a system for streaming an event, comprising:
  an event stream generator configured to generate an event stream;
  a user device; and
  a server,
  wherein the event stream generator is further configured to transmit to the server an event stream identifier for identifying the event stream;
  wherein the server is configured to:
    store in a database the event stream identifier transmitted from the event stream generator to the server; and
    in response to a request for the event stream identifier by a user, transmit the stored event stream identifier and supplementary content to a user device of the user,
  wherein the user device is configured to:
    receive from the event stream generator the event stream generated by the event stream generator using the event stream identifier transmitted from the server to the user device; and
    combine the supplementary content transmitted from the server to the user device and the event stream received from the event stream generator, for display to the user of the user device.

In a third aspect, the invention provides a method of streaming an event, comprising:
  requesting a server for an event stream identifier stored in a database, the event stream identifier identifying an event stream generated by an event stream generator;
  receiving, by a user device, the stored event stream identifier and supplementary content from the server;
  requesting the event stream using the received event stream identifier;
  receiving, by the user device, the event stream from the event stream generator;
  combining, by the user device, the received supplementary content and the received event stream; and
  displaying the combined supplementary content and event stream to a user.

In a fourth aspect, the invention provides a user device for streaming an event, comprising:
  a display;

a transceiver for communicating with a server and an event stream generator; and a processor configured to:
control the transceiver to request the server for an event stream identifier stored in a database, the event stream identifier for identifying an event stream generated by an event stream generator;
control the transceiver to receive the stored event stream identifier and supplementary content from the server;
control the transceiver to request the event stream using the received event stream identifier;
control the transceiver to receive the event stream from the event stream generator;
combine the received supplementary content and the received event stream; and
control the display to display the combined supplementary content and event stream to a user.

The invention also provides computer program code which when executed implements the above method of streaming an event. Also, the invention provides a tangible computer readable medium comprising the above computer program code. Also, the invention provides transmission of the above computer program code.

Because the event stream can be received from the event stream generator (in particular, directly from a camera feed) as opposed to from any intermediary, the likelihood of delay is minimized. Also, since the server need not have the responsibility of broadcasting multiple event stream or combining streams (let alone combining streams with additional data such as supplementary content like advertising), the likelihood of creating a bottleneck at the server is reduced.

BRIEF DESCRIPTION OF DRAWINGS

In order that the invention may be more clearly ascertained, embodiments will now be described by way of example with reference to the accompanying drawings in which.

DETAILED DESCRIPTION OF EMBODIMENTS OF THE INVENTION

Referring to the drawings, there are illustrated embodiments of a system 10 for streaming an event (in particular, a live event, such as a football game, in real-time). The system 10 comprises a number of computing devices including at least one event stream generator 13, at least one user device 19 (for example, a mobile computing device such as a smartphone or a portable computer such as a tablet computer) and a server 18 (which may or may not be cloud-based).

These different computing devices are distributed in that the devices can be in different locations while still working with each other. Each event stream generator 13 may communicate with the server 18. Each event stream generator 13 may also communicate with each user device 19. Each user device 19 may communicate with the server 18. As will be explained in further detail below, each user device 19 receives communications from the server 19 by way a communication path that is different to the communication path that is used by the user device 19 to receive communications from an event stream generator 13.

Figure 1:
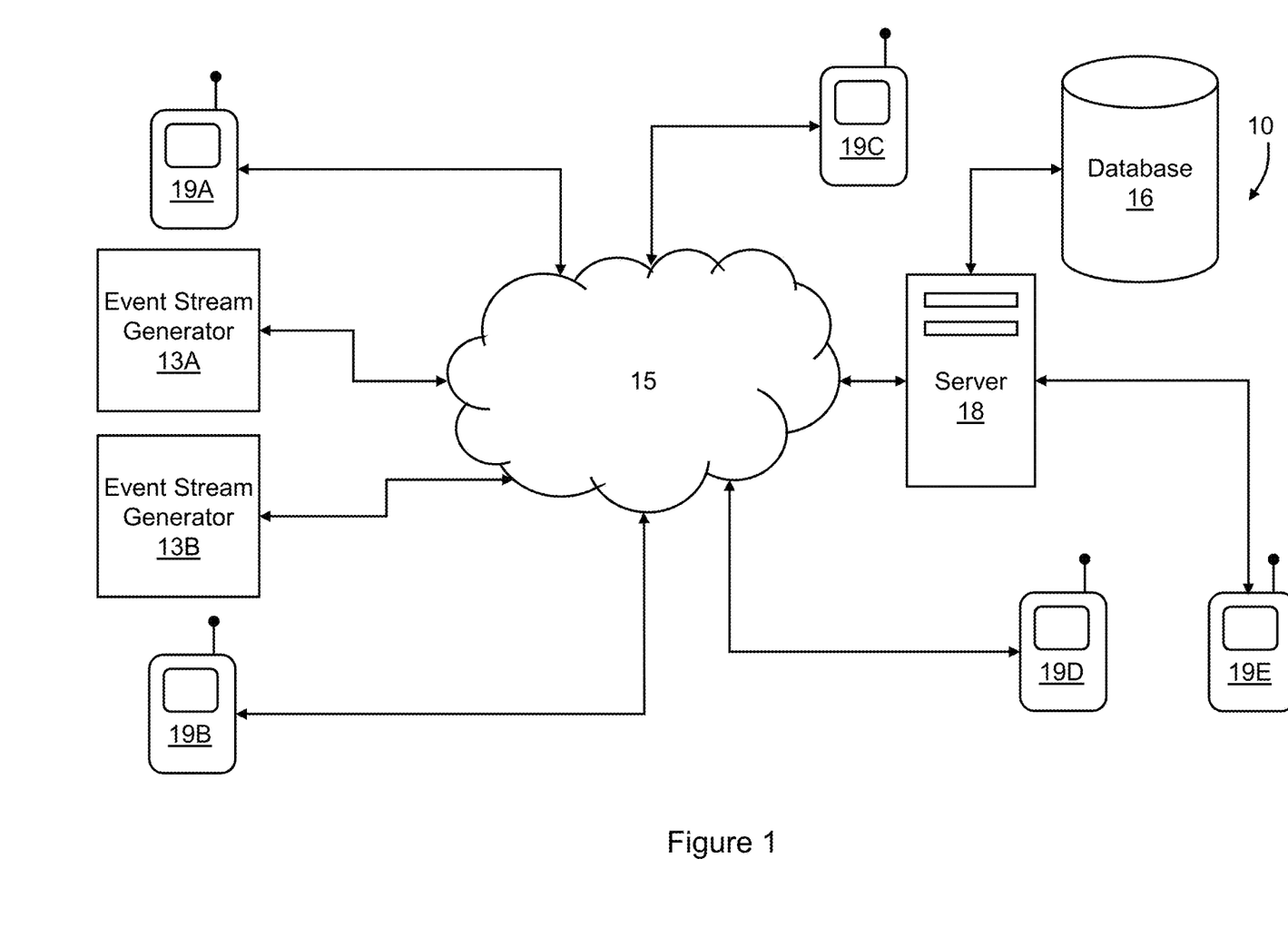
FIG. 1 is a schematic diagram of the physical architecture of an embodiment of the system 10 for streaming an event.

FIG. 1 is a schematic diagram of the physical architecture of an embodiment of the system 10 for streaming am event. This distributed computing system 10 comprises a plurality of user devices in the form of tablet devices 19A, 19B, 19C and a server 18 in communication over a network in the form of the Internet 15 with the plurality of tablet devices 19A, 19B, 19C. The distributed computing system 10 also comprises a plurality of event stream generators 13A, 13B in communication over the Internet 15 with the server 18 and the plurality of tablet devices 19A, 19B, 19C.

Each event stream generator 13 is configured to generate an event stream (which may comprise video, audio, or both video and audio) or stream of the event for broadcast, multi-cast or some other form of transmission. Each event stream generator 13 is also configured to transmit to the server 18 an event stream identifier for identifying the event stream. Depending on the implementation, an event stream generator 13 may or may not be configured to encode the event stream before broadcasting the event stream. In an implementation of an event stream generator 13 that is not configured to encode an event stream, the event stream generator 13 may be connected to a separate stream encoder that is configured to encode the event stream and the event stream generator 13 may be configured to receive the encoded event stream from the stream encoder before broadcasting, multi-casting or otherwise transmitting the event stream to other devices such as the user devices 19.

The server 18 is configured to store the event stream identifier transmitted from each event stream generator 13 to the server 18 in a database 16. Depending on the implementation, the database 16 may be a separate device to the server 18 or may be integrated together with the server 18. In an implementation where the database 16 and the server 18 are separate, the database 16 and the server 18 may be connected by way of one or more networks. For example, either one or both of the database 16 and the server 18 may be cloud-based and accordingly in communication by way of the Internet.

Each user device 19 is configured to request the server 18 for an event stream identifier. The server 18 is configured to transmit an event stream identifier and supplementary content to a user device 19, in response to a request for the event stream identifier from the user device 19. Each user device 19 is configured to receive the event stream generated by an event stream generator 13 using the event stream identifier transmitted from the server 18 to the user device 19. Advantageously, the event stream can be received from the event stream generator by the user device 19 in a first communication path while the event stream identifier and the supplementary content can be transmitted from the server 18 to the user device 13 over a different second communication path. Each user device 19 is configured to combine the supplementary content transmitted from the server 18 to the user device 19 and the event stream received from the event stream generator 13, for display to the user of the user device 19.

Figure 2:
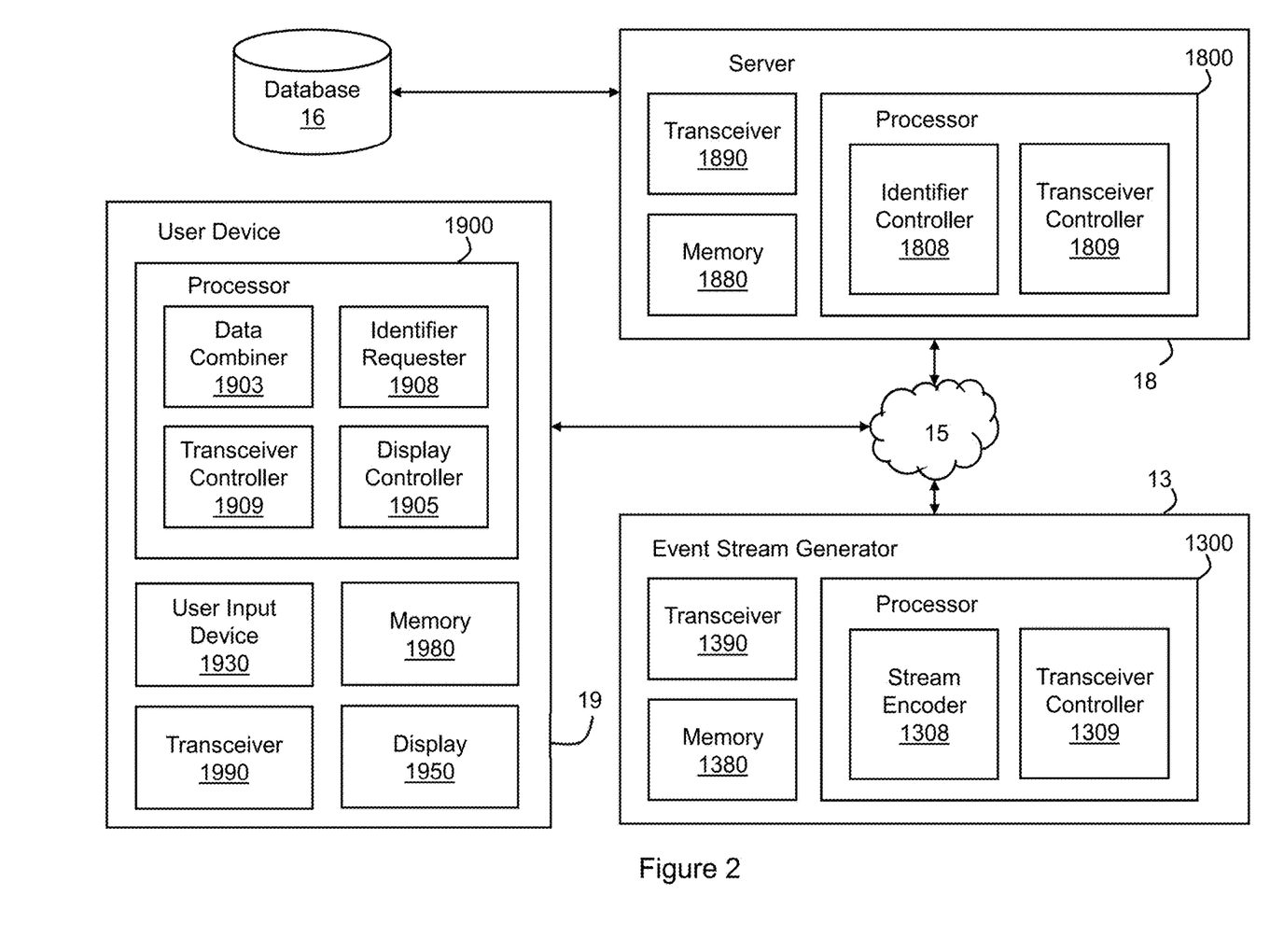
FIG. 2 is a schematic diagram showing more specific components of each device of the system 10 of FIG. 1.

FIG. 2 is a schematic diagram showing more specific components of each user device 19, each event stream generator 13 and the server 18 of the distributed computing system 10. Each user device 19, each event stream generator 13 and the server 18 of the distributed computing system 10 comprises a number of functional components for streaming an event. It is envisaged that the functional components are typically implemented by a processor executing program code and data stored in a memory. However, persons skilled in the art will appreciate that this need not be the case. For example, one or more of the components could be implemented in an alternative manner, for example, as a dedicated circuit.

Beginning first with the event stream generator 13, the event stream generator 13 comprises a transceiver 1390, a processor 1300 and memory 1380. The memory 1380 stores program code and data which when executed by the processor 1300 implements a stream encoder 1308 and a transceiver controller 1309. As indicated above, in an alternative embodiment of the distributed computing system 10, an event stream generator 13 may not include the stream encoder 1308 but may be connected to a separate stream encoder that is configured to encode the event stream and the event stream generator 13 may be configured to receive the encoded event stream from the stream encoder.

The stream encoder 1308 is arranged to encode a video and audio feed that is received from a device such as a camcorder. It is envisaged that the feed is encoded in real time while the camcorder is still capturing or recording the live event. As indicated above, in an alternative embodiment of the distributed computing system 10, an event stream generator 13 may include the device (such as a camcorder) for capturing or recording the video and audio feed. Also, it is envisaged that an alternative embodiment of the distributed computing system 10 may include encoding merely either a video only feed or an audio only feed, rather than a video or audio feed. In such an alternative embodiment, the stream encoder 1308 may be arranged to receive the feed from a device other than a camcorder such as a microphone.

The transceiver controller 1309 is arranged to control the transceiver 1390 to broadcast the encoded stream. In addition, the transceiver controller 1309 is arranged to control the transceiver 1390 to transmit event stream identifier for another device or devices to identify the encoded stream that is broadcast, multi-cast or otherwise transmitted by the transceiver controller 1309. It is envisaged that the event stream identifier is typically some form of uniform resource locator (URL) such as an internet protocol (IP) address. However, a person skilled in the art will appreciate that another form of identifier may be used in place of a URL. In this embodiment, the event stream identifier is transmitted from the event stream generator 13 to the server 18 for storage. Depending on implementation, additional information may be transmitted together with the event stream identifier to the server 18. For example, information relating to the event may be included when transmitting the event stream identifier to the server 18. In this respect, it is envisaged that such additional information may not be transmitted together with the event stream identifier from the event stream transmitter 13 to the server 18 but rather separately from the event stream identifier. Advantageously, the distributed computing system 10 may be scaled up to provide more event streams by simply having more event stream identifiers from either existing or additional event stream generators 13.

Turning now to the server 18, the server 18 comprises a transceiver 1890, a processor 1800 and memory 1880. The memory 1380 stores program code and data which when executed by the processor 1800 implements an identifier controller 1808 and a transceiver controller 1809.

The identifier controller 1808 is arranged to store an event stream identifier transmitted from an event stream generator 13 to the server 18. Specifically, the identifier controller 1808, upon receiving the event stream identifier from the event stream generator 13, stores the event stream identifier in the database 16. As illustrated in FIG. 2, the database 16 is a separate device to the server 18 in this embodiment of the distributed computing system 10. However, it is envisaged that the database 16 may be part of the server 18 in an alternative implementation of the server 18. If additional information is included in the transmission of the event stream identifier or separately transmitted from the event stream generator 13 to the server 18, the identifier controller 1808 may store the additional information in association with the event stream identifier in the database 16 such as both the additional information and the event stream identifier may be retrieved from the database 16 together.

The database 16 comprises supplementary content in this embodiment of the distributed computing system 10. It is envisaged that the supplementary content may be stored in a different device in an alternative embodiment of the distributed computing system 10. In this embodiment, the supplementary content comprises advertising content. In an implementation of the server 18, the server 18 is arranged to enable a user to upload the supplementary content to the database 16. In such an embodiment, the memory 1880 of the server 18 may include program code and data for enabling the processor 1800 of the server 18 to implement a supplementary content receiver for receiving the supplementary content. For example, the server 18 may implement a supplementary content receiver for receiving supplementary content from any one of the user devices 19.

The transceiver controller 1809 implemented by the processor 1800 of the server 18 is arranged to control the transceiver 1890 of the server 18 to transmit an event stream identifier or identifiers stored in the database 16 to a user device or user devices 19. In this embodiment of the distributed computing system 10, the transceiver controller 1809 transmits an event stream identifier to a user device 19 in response to receiving from the user device 19 a request for the event stream identifier transmitted. However, it is envisaged that an alternative embodiment of the distributed computing system 10 may involve the transceiver controller 1809 transmitting an event stream identifier to a user device 19 in response to receiving a request for the event stream identifier transmitted from another user device 19, automatically in accordance with a predetermined rule, or some other device that is not part of the distributed computing system 10.

In addition to transmitting the event stream identifier to a user device 19, the transceiver controller 1809 is also configured to control the transceiver 1890 of the server 18 to transmit supplementary content to the user device 19 upon receiving a request for the event stream identifier transmitted from the user device 19. In this implementation of the server 18, the supplementary content is retrieved by the server 18 from the database 16 that is connected to the server 18. However, it is envisaged that the supplementary content may be retrieved from elsewhere, for example, locally from the memory 1880 of the server 18, or from some other device such as a user device 19. Depending on the implementation, the supplementary content may be transmitted to a user device 19 together with or separately from an event stream identifier. It is envisaged that the server 18 may also transmit supplementary content periodically, randomly or otherwise in accordance with a user input, to a user device 19 upon the server 18 transmitting an event stream identifier to the user device 19. For example, after a user device 19 has been authenticated by the server 18, the server 18 may transmit supplementary content to the user device 19 after the user device has re-connected with the server after being disconnected for a period of time.

Turning now to the user devices 19, each user device 19 comprises a user input device 1930, a display 1950, a transceiver 1990, a processor 1900 and memory 1980 in this embodiment of the distributed computing system 10. A designated software application (or app) is installed on the user device 19, that is, stored in the memory 1980, for execution by the processor 1900. When the software application is executed by the processor 1900, the user device 19 can request the server 18 for an event stream identifier from the server 18. In this implementation of the user device 19, the user device 19 must first be authenticated by the server 18 in order to make the request. It is envisaged that such authentication may involve the user device 19 transmitting login information (such as a username and password) of a user of the user device 19 to the server 19, but a person skilled in the art will appreciate alternative embodiments of the distributed computing system 10 may involve other methods of authentication.

Upon authentication of the user device 19, the executed software application can be used to retrieve from the server 18 information on one or more event stream identifiers, each of the event stream identifiers being for identifying a respective one of one or more event streams, the event streams being broadcast by respective event stream generators. The retrieved information can then be displayed on the display 1950.

A user of the user device 19 can use the executed software application to generate a request for an event stream identifier stored in the database 16 and to control the transceiver 1990 to send the request to the server 18. In this implementation of the user device 19, the processor 1900 is configured to implement a data requester 1908 for generating the request and a transceiver controller 1909 configured to control the transceiver 1990 to transmit the request to the server 18. Upon receiving the event stream identifier from the server 18, the user device 19 can use the event stream identifier to receive the event stream corresponding to the event stream identifier. By using the event stream identifier, the event stream can be received from the event stream generator 13 broadcasting the event stream. In this implementation of the user device 19, the transceiver controller 1909 is used to control the transceiver 1990 to both receive the event stream identifier from the server 18 and to receive the event stream from the event stream generator 13. However, it is envisaged that an alternative embodiment of the distributed computing system 10 may comprise a user device or devices 19 comprising multiple transceivers 1990, one for receiving event stream identifiers from the server 18, and others for receiving event streams from respective event stream generators 13.

Using the program code and data corresponding to the software application stored in the memory 1980, the processor 1900 can implement a data combiner 1903 that is configured to combine the received event stream with supplementary content received from the server 18. The combined event stream and supplementary content can then be displayed by the display 1950 to a user. In this respect, it is envisaged that the supplementary content is typically overlaid on top of the event stream in an accordance with settings that are either predetermined or determined by the software application. However, a person skilled in the art will appreciate that the supplementary content may be combined with the event stream differently, that is, other than overlaying the supplementary content on the event stream. Also, a person skilled in the art will appreciate that the manner in which the supplementary content is combined with the event stream may be based on settings transmitted from the server 18, an event stream generator 13, or both. For example, the supplementary content may be combined with the event stream such that a carousel comprising multiple event streams and advertising may be displayed by a user device 19, as described in FIGS. 5 and 6 relation to an embodiment of the distributed computing system 10.

Figure 3:
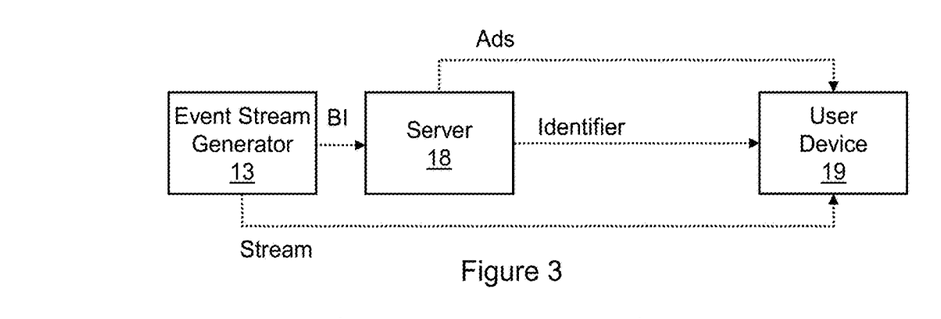
FIG. 3 is a schematic diagram showing more specifically the data flows between each device of the system 10 of FIGS. 1 and 2.

FIG. 3 is a schematic diagram showing more specifically the data flows between each event stream generator 13 and the server 18, between each user device 19 and the server 18, and between each event stream generator 13 and each user device 19 in this embodiment of the distributed computing system 10. As illustrated in FIG. 3, an event stream generator 13 is configured to transmit an event stream identifier to the server 18. While the event stream generator 13 does not transmit the event stream identifier to a user device 19, the event stream identifier transmitted from the event stream generator 13 to the server 18 can subsequently be transmitted from the server 18 to the user device 19. By using the event stream identifier transmitted from the server 18 to the user device 19, the user device 19 can receive an event stream from the event stream generator 13. Also, the server 18 can transmit to advertising or other supplementary content to the user device 19. As indicated above, such advertising can be transmitted together with or separately from the event stream identifier. For example, advertising could be transmitted to each user device 19 periodically after any user device 19 is authenticated, such that any new advertising stored in the database 16 may be circulated to all authenticated user devices 19 even if a user device 19 is not receiving an event stream at the time the advertising is transmitted to the authenticated user devices 19.

As illustrated in FIG. 3, the event stream and the advertising are received by the user device 19 from different devices in the form of the event stream generator 13 and the server 18, using different communication paths. Depending on the implementation, the advertising and the event stream identifier may also be received by the user device 19 from the server 18 using different communication paths, for example, if the advertising is transmitted from the server 18 to the user device 19 separately from the event stream identifier.

While FIG. 3 illustrates only the user device 19 receiving the event stream from the event stream generator 13, it is envisaged that multiple user devices 19 may be receiving the same event stream from the event stream generator 13. Also, it is envisaged that the user device 19 may receive multiple event streams from respective event stream generators 13. It is also envisaged that the server 19 may be receiving event stream identifiers from multiple event stream generators 13, and transmitting event stream identifiers and supplementary content to multiple user devices 19. A person skilled in the art will also appreciate that multiple transmissions may be received simultaneously or separately.

Figure 4:
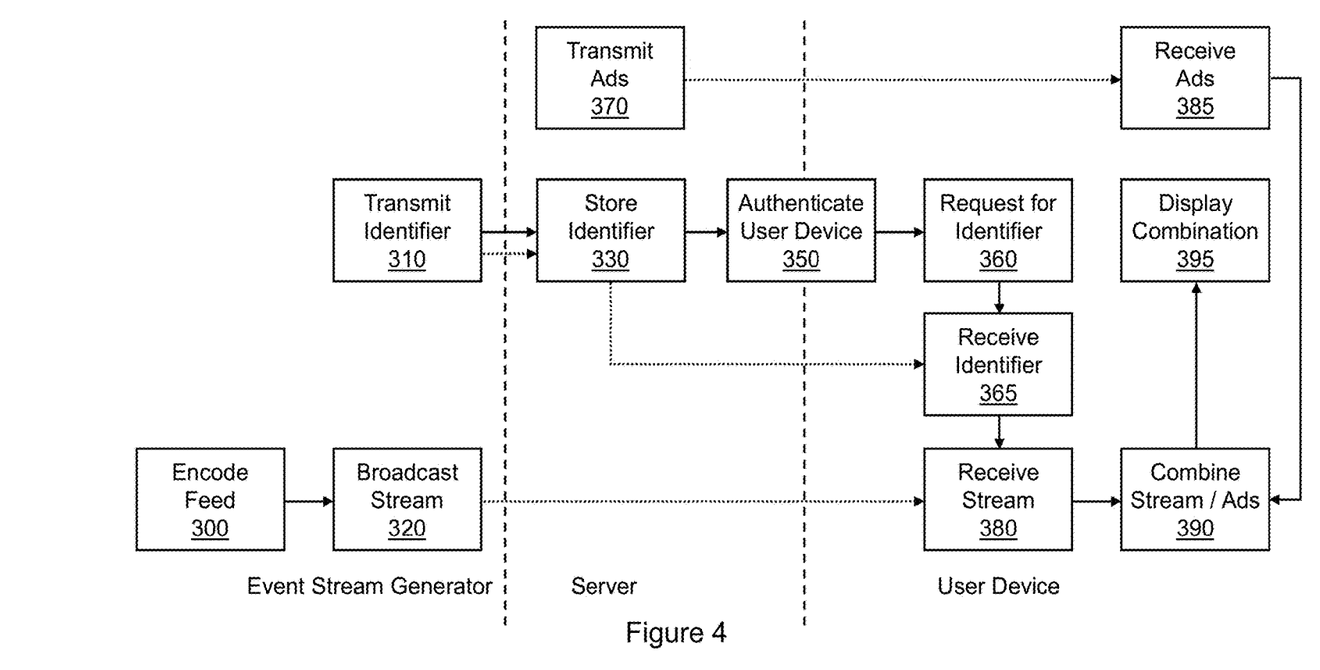
FIG. 4 is flow chart of an embodiment of a method of streaming an event, carried out using the system 10 of FIGS. 1, 2 and 3.

FIG. 4 is flow chart of an embodiment of a method of streaming an event, carried out using the distributed computing system 10 of FIGS. 1, 2 and 3.

Firstly, a feed of the event is encoded by the stream encoder 1308 implemented by the processor 1300 of an event stream generator 13 into an event stream based on program code and data stored in the memory 1380 of the event stream generator 13 at step 300. Subsequently, the event stream generator 13 generates the event stream at step 320 and transmits an event stream identifier corresponding to the event stream or the event stream generator 13 at step 310. In this implementation of the event stream generator 13, the transceiver controller 1309 implemented by the processor 1300 of the event stream generator 13 controls the transceiver 1390 in order to generate the event stream and transmit the event stream identifier.

The event stream identifier transmitted from the event stream generator 13 to the server 18 is received by the transceiver 1890 of the server 18. The received event stream identifier is then stored in the database 16 by the identifier controller 1808 implemented by the processor 1800 of the server 18 based on the program code and data stored in the memory 1880 of the server 18 at step 330.

Then, a user device 19 attempts to communicate with the server 18. In order for the communication to be established, there is an exchange of information between the server 18 and the user device 19 at step 350 in order for the user device 19 to be authenticated. It is envisaged that the authentication may involve either significant interaction between a user of the user device 19 and the server 18, or almost no interaction, for example, in an automated setting where the user device 19 is recognized and authenticated automatically based on a characteristic of the user device. In this implementation of the user device 19, the transceiver controller 1909 is implemented by the processor 19 of the user device 19 based on a software application stored in the memory 1980 of the user device 19 in order to enable authentication of the user device 19.

At step 360, the user device 19 makes a request for an event stream identifier that is stored in the database 16. Before making the request, the server 18 may transmit to the user device 19 information relating to the event stream identifier. The server 18 may also transmit other information such as information relating to other event stream identifiers, information relating to the event, or even other information such as what advertising may be overlaid on any event stream. The request is made by the identifier requester 1908 implemented by the processor 19 of the user device 19 based on a software application stored in the memory 1980 of the user device 19 in this embodiment of the distributed computing system 10, but it is envisaged that the request may be made by some other device in an alternative embodiment of the distributed computing system 10.

At step 365, the transceiver controller 1909 implemented by the processor 19 of the user device 19 receives the event stream identifier that is transmitted from the server 18 in response to the request made at step 360. As illustrated in FIG. 4, the transmitted event stream identifier corresponds to the event stream identifier that is stored by the server 18 at step 330. Using the received event stream identifier, the user device 19 can identify the event stream that is generated by the event stream generator 13 at step 320. In particular, the user device 19 can provide the event stream generator 13 of identification of the event stream, by transmitting to the event stream generator 13 a request for a transmission of the event stream, the request comprising the event stream identifier. Accordingly, the transceiver controller 1909 implemented by the processor 19 of the user device 19 can receive the event stream generated by the event stream generator 13 at step 380 without the event stream generator 13 transmitting the event stream identifier directly to the user device 19.

After the user device 19 is authenticated by the server 18 in this embodiment of the distributed computing system 10, the server 18 transmits to the user device 19 advertising or some other supplementary content that is stored in the database 16. As indicated above, the advertising or other supplementary content may be transmitted together with the event stream identifier from the server 18 to the user device 19 or separately in different communication paths at different times. At step 385, the user device 19 receives the advertising or other supplementary content transmitted from the server 18 to the user device 19.

At step 390, the data combiner 1903 implemented by the processor 1900 of the user device 19 combines the event stream received at step 380 and the advertising or other supplementary content received at step 385, for example, by overlaying the advertising on top of the event stream. The combination of the event stream and advertising is then displayed on the display 1950 of the user device 19 under the control of the display controller 1905 implemented by the processor 19 of the user device 19.

Figure 5:
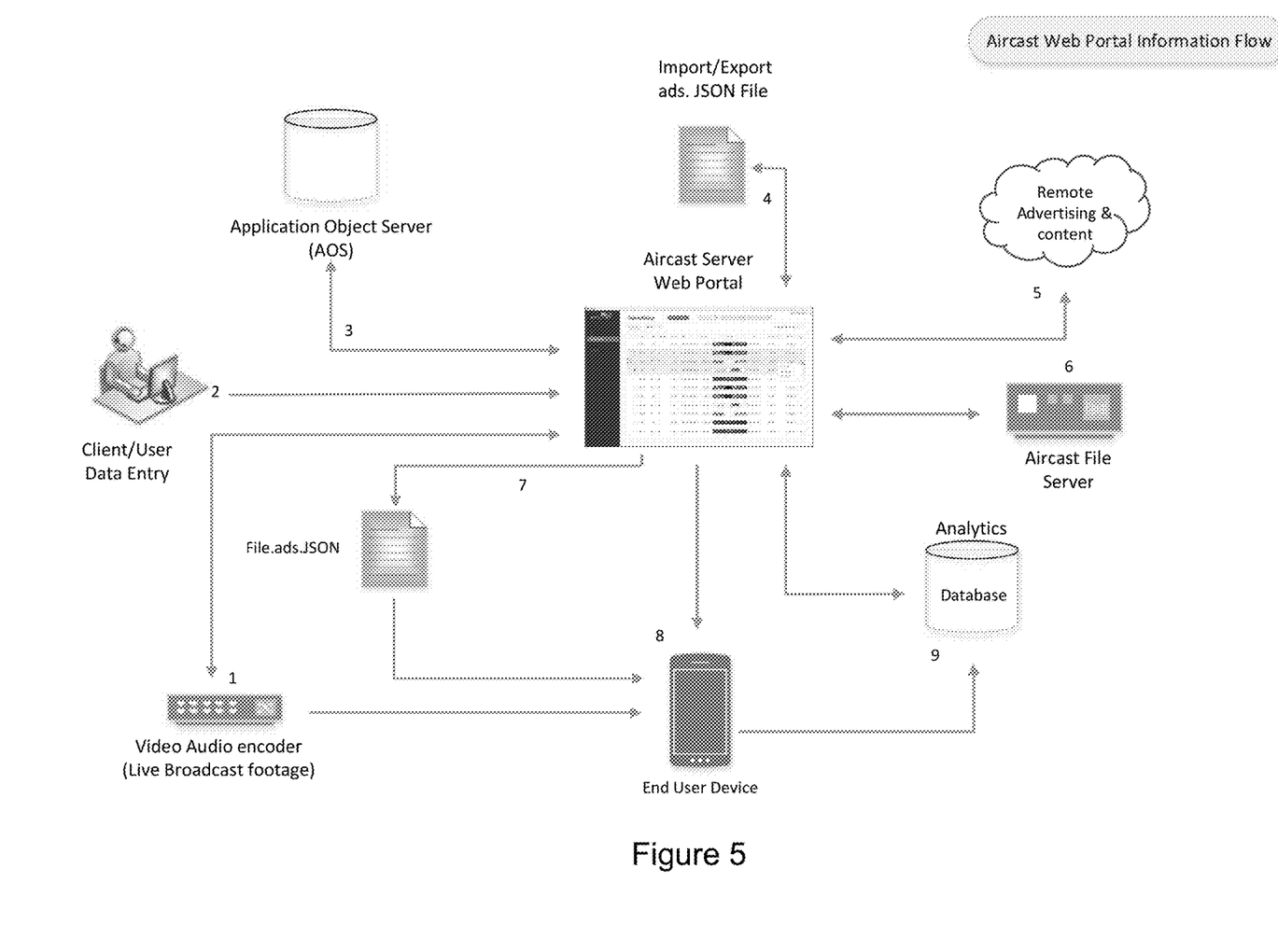
FIG. 5 is a schematic diagram of an embodiment of a method of streaming an event.

FIG. 5 is a schematic diagram of an embodiment of a method of streaming an event, specifically a live event, that may be carried out using an embodiment (named "Aircast™") of the distributed computing system 10. In this embodiment, the distributed computing system 10 provides a real-time streaming service for event patrons, in particular, direct access to host broadcasts, different broadcasts from multiple camera angles, supplementary content including commentary and data etc. As set out in the following flow of steps, this embodiment of the distributed computing system 10 comprises a sophisticated software tool to enable, advertising, live and on demand content management.

At step 1, host broadcast feeds or individual camera feeds are received in standard digital interface (SDI) or similar format by event stream generators 13 at the event. The feeds are presented to a stream or video audio encoder or encoders that convert the feeds into an advanced video coding (AVC) (or H264 or H265) stream or streams. The streams are identified by individual IP addresses and can be broadcast or multicast to multiple user devices 19 by real-time transport protocol (RTP) or some other protocol or protocols. The streams can be decoded by user devices 19 that have a designated software application (specifically, an Aircast mobile application). It is envisaged that the streams can be video streams with ultra-low latency, for example, at only 0.3 seconds. In order for users of user devices 19 to receive any one or more of the broadcast streams, the users must first be authenticated via a web portal that can be provided by a server 18. In this embodiment, the authentication can be by either, recognised login details or direct detection between both the web portal provided by the server 18 and the software application at a user device 19 to confirm authentication and enable broadcast stream decoding and reception.

The broadcast feeds (or direct feeds) encoded at step 1 are identified within the web portal to allow the streams to be decoded and received by the user devices 19 using the Aircast application. The web portal enables detection and authentication when it confirms that streams can be received via corresponding IP addresses that has been entered using the web portal. The web portal can denote the order where each feed is represented in as well as the order each feed is presented by the Aircast application.

As indicated in step 2, a client or operator can directly access the web portal. The portal can be accessible online and remotely via the Internet. Each feed is presented in the portal by either a content, advertising or menu section in which accessible feeds are listed in an order corresponding to the manner in which the feeds are represented and accessible by way of the Aircast application. Each piece of content, external feed or image can be uploaded and modified within the portal.

Advertising is enabled within the portal by enabling specific advertising banners and logos which are loaded using the portal. Javascript object notation (JSON) or other similarly formatted files can be uploaded, processed (for example, by loading advertising images and advertising control data), and overlaid on streams (for example, by way of overlaying advertising user interface (UI) images on screen) displayed at each user device 19. In this respect, a person skilled in the art will appreciate that files may be based on formats (such as XML) other than JSON. This advertising can be controlled by using the portal and can be displayed as a pop-up advertising or slide in advertising depending on client or advertiser requirements. The software also enables advertising to appear at required time intervals as well as duration, for example, by way of instructions or information that are part of advertising webpage specified using the web portal.

As indicated in step 3, the web portal can be run on as an application object server (AOS). This is a 3-tiered database server for storing data that is uploaded using the web portal and allows each piece of data to be executed (via the web portal) and accessed (via the Aircast application). Each selection made by a user triggers a service call to the server to call the content required. The AOS does not have to control Internet or remote advertising that is made available in step 5.

As indicated in step 4, JSON files can also be directly uploaded and rendered to the web portal by using and activating an Import JSON file function. This process works by making a service call directly to a file server directory where data, content can be stored and activated when called on. As indicated in step 4, using the web portal can also allow a user to export JSON files to review uploaded content and store and save any projects.

As indicated in step 5, remote adverting and other external content can also be directly accessed by way of the web portal, by providing a direct link to the source of the content. The portal enables all addressing to activate a service call to external data which can also be accessed by the Aircast application. External content can be connected directly via the Internet and can be viewed in real time when an end user clicks on a link that represents the content. External advertising can be managed by a client or web portal operator which can organise display of the content in any position on the Aircast application. Alternatively, this can be enabled and processed over a live broadcast via a JSON file.

At indicated in step 6, the server 18 can provide the web portal and a localised backend where a client can organise readily available content that can be called upon or changed as needed. The server 18 can thus provide a readily available inventory of commonly required feeds or provides a client the ability to upload content that can then be selected and uploaded to the portal. The server 18 can contain images, video on demand (VOD) content, adverting content, data and promotional material. The web portal enables uploads of such material as required and a client can add move and change the content as well as the order or display.

At indicated in step 7, content can be uploaded to the web portal as mentioned in steps 2 and 4, for example, by way of a content.JSON file and these ads can be programmed into the Aircast application by reading the content.JSON file every 15 seconds and checking if there is any new data to apply to the Aircast application. Each advertisement can be programmed using the web portal to be displayed based on one or more time and duration settings and a pre-programmed order, for example, by reading an ads.JSON file every 15 seconds and checking if there any new data to apply to the Aircast application). Display of the Aircast application can also be set to random depending on advertising preferences.

At indicated in step 8, the Aircast application can presented in such a way that it mirrors the order each of the feeds are made available by corresponding with the server 18. If a live broadcast or any other feed is presented in the portal at the top of the menu, the Aircast application can also display this feed at the top of the Aircast application. The Aircast application is able to access all content that is linked via the portal whether this is local stored feeds, live broadcast feeds or external intern feeds and advertising. This can be done via a local wireless network and by directly linking each IP address of individual feeds or advertising whether the feeds are local or external.

At indicated in step 9, an analytics database 16 can also form part of the distributed computing system 10. The database 16 can record each user's behaviour whilst the user is using the Aircast application, for example, by tracking usage data such as period used, chosen feeds, advertising exposure and location. These analytics can then be presented in a web portal dashboard.

Figure 6:
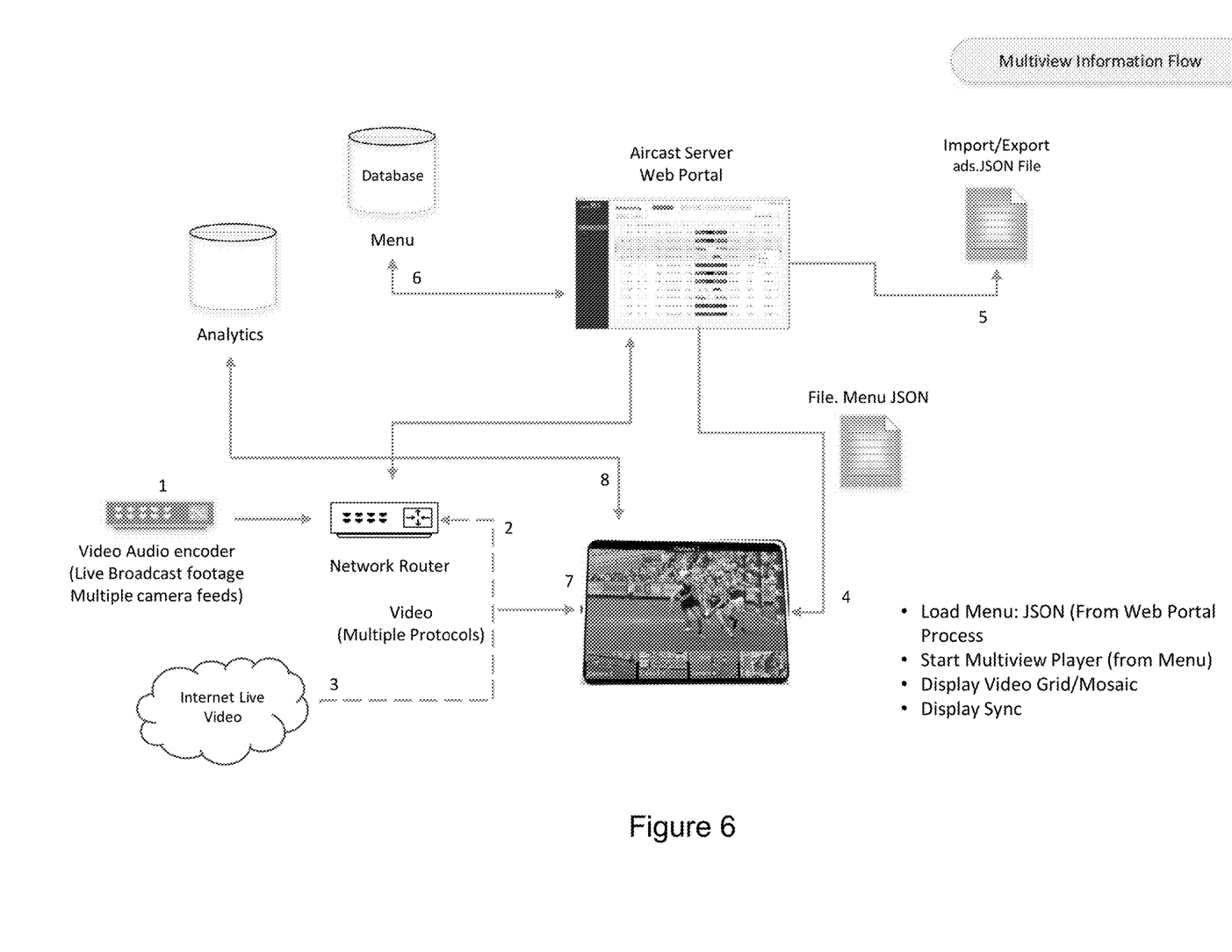
FIG. 6 is another schematic of the embodiment of the method of FIG. 5.

FIG. 6 is another schematic diagram of the embodiment of the method of broadcasting an event of FIG. 5. As set out in the following flow of steps, the embodiment of the distributed computing system 10 of this embodiment of the method of streaming an event allows a user of a user device 19 to select specific camera angles of a broadcast by way of a live camera feed preview on the user device 19 before the feed is selected:

Step 1 corresponds to step 1 of FIG. 6 where host broadcast feeds or individual camera feeds are received in standard digital interface (SDI) or similar format by event stream generators 13 comprising stream or video audio encoders at the event.

The encoded broadcast feeds are identified within the web portal via a router at step 2 to allow the stream to be decoded and received by user devices 19 using the Aircast mobile application.

Once the broadcast feeds are transmitted by an encoder, the router at step 2 allows connection with the web portal to authenticate the feeds and IP addresses that are stored in the portal and also the Aircast mobile application. The router also enables connectivity with other networks and hence enables the Aircast mobile application to access local and external networks.

As illustrated in step 3, Internet live video and data can be directly accessible through direct connectivity via the router and each selected feed corresponds with a feed order and an IP address in the web portal and the Aircast mobile application. The Aircast application is able to render and preview each feed that is listed in the web portal and operates the same way by pulling video and data feeds directly from the Internet as it does for live broadcast footage via the encoder. The Aircast application can display unlimited feeds by creating a preview window for each connected and designated feed from the Internet and the web portal. Once a corresponding IP address and source of a feed has been activated, the Aircast application can automatically create a preview upon activation of such a preview functionality by a user, for example, by selecting a Multiview function in a navigation menu and using an upward slide motion on a main screen. By activating such a functionality, preview of each connected live or Internet video and corresponding data feed can be provided in the web portal. Multiple operations of such a functionality can be used in the Aircast application for example, for post interviews, highlights and any other data feeds.

As illustrated in step 4, the web portal can be used to control and activate all connected feeds. This is done by recording each feed as a source in a menu. Each feed can be identified as a JSON file in the web portal. Each file represents a live feed (which can be an internal or local feed) that is recorded in the menu. Each loaded entry can have multiple feeds listed. There can be more than 20 feeds listed if required. The order of each feed and as it is recorded in the menu can directly correspond to the order it is represented and displayed in the Aircast application. Once selected from a navigation list, a player in the Aircast application can automatically start and display a grid or mosaic including each activated feed in the web portal.

As illustrated in step 5, JSON files can be directly uploaded and rendered to the web portal by using and activating an Import JSON file. As previously illustrated in step 4 of figure this process can work by making a service call directly to a file server directory where data, content can be stored and activated when called on. This allows a user to view each feed within a menu to select or chose a feed based on what is available.

As illustrated in step 6, a database 16 can form part of the distributed computing system 10, specifically, to store any detail of each feed. Each VOD or data feed that is to be stored locally can be stored in this database 16 Source details for each online, live or other external video feed can also be stored in this database 16. Each feed selection made on the Aircast application can initiate a service call to each selected feed whether live or on demand content. A video can be streamed or fed via real time protocol (RTP) or one or more other suitable protocols (that is, via one protocol or via multiple protocols) to a mobile device as illustrated in step 7.

As previously indicated in step 8 of FIG. 5, the Aircast application can presented in such a way that it mirrors the order each of the feeds are made available by corresponding with the server 18. For example, the above-mentioned Multiview functionality can be activated by a slide up motion to reveal connected cameras and a preview of each available feed. Once the number of cameras exceeds 4, the display can be automatically rendered to a moving carousel (for example, a laterally moving one which operates left to right) for a user to select a chosen camera.

As illustrated in step 8, the database 16 may also comprise an analytics database as previously indicated in step 9 of FIG. 5.

Figure 7:
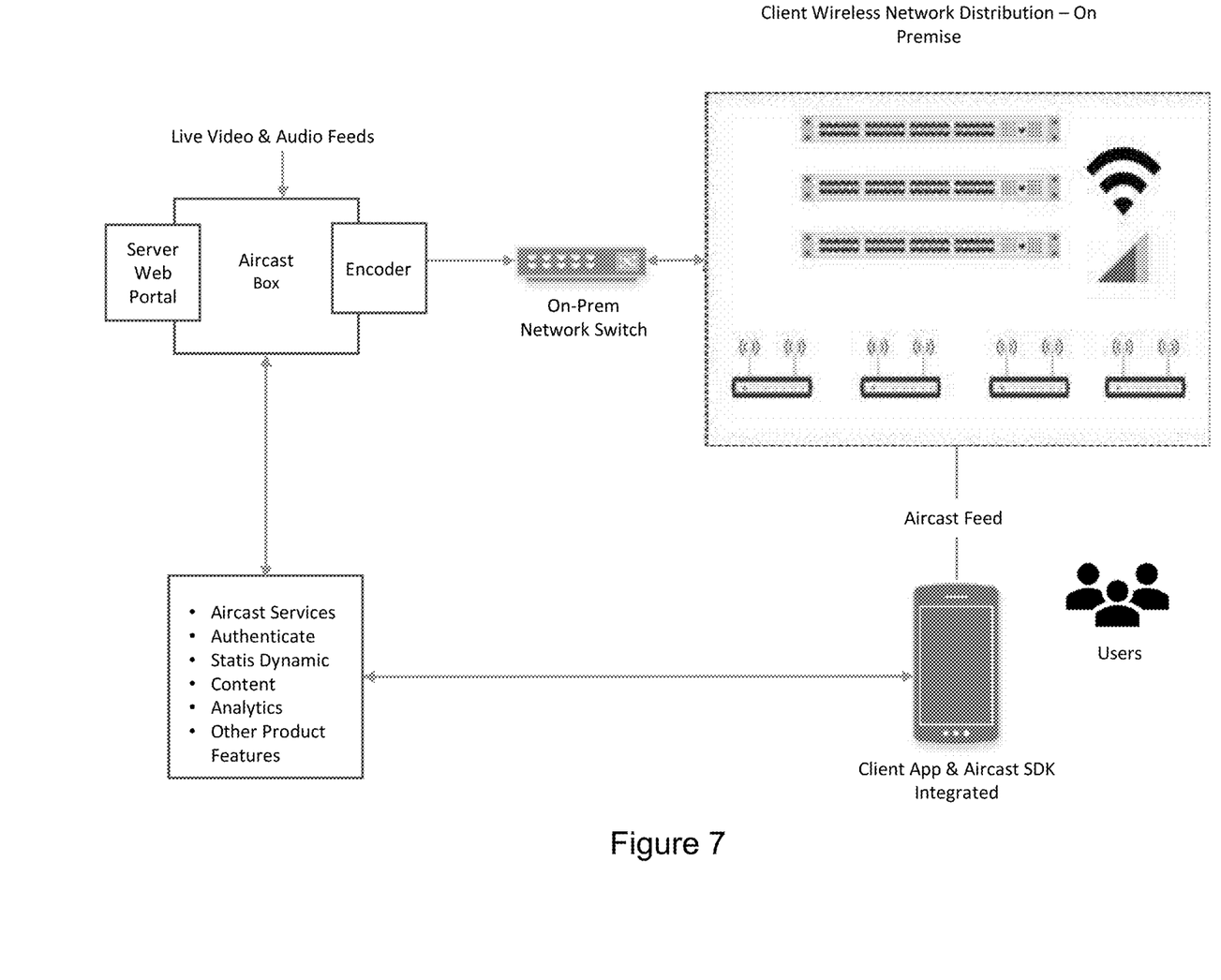
FIG. 7 is a schematic diagram of an embodiment of a method of enabling a device to carry out an embodiment of a method of streaming an event.

FIG. 7 is a schematic diagram of an embodiment of a method of enabling a device to carry out an embodiment of the above method of streaming an event, comprising providing computer program code such that an embodiment of the above method of streaming an event can be carried out.

In this embodiment, the computer program code comprises a software development kit (SDK). As will be explained in more detail below, this SDK can be provided to a user for the user to embed functionalities relating to the above mentioned Aircast mobile application into another mobile application such that the other mobile application can then be used to perform an embodiment of the above method of streaming an event such as a live event. It is envisaged that the computer program code can be provided to the user in different ways. For example, in an embodiment, the computer program code can be transmitted to (for example, downloaded from remote storage by) the user. In another embodiment, the computer program code can be provided to the user by way of a computer readable medium (or storage medium) such as a USB device. Depending on the embodiment, it is envisaged that different parts of the computer program code can be provided in different ways. For example, one part of the computer program code can be transmitted to the user while another part of the computer program code can be provided by a tangible computer readable medium.

In relation to the embodiment of FIG. 7, it is envisaged that the user can be a developer of a third-party mobile application ("Client App"), that is, a mobile application other than the above mentioned Aircast mobile application, and the SDK can be provided to the developer such that the developer can then embed one or more "Aircast Services" (such as Authenticate, Static and Dynamic Content, and Analytics, as indicated in FIG. 7) into the Client App for use by one or more users of the Client App.

Turning now to the figure itself, the method of enabling the device to carry out an embodiment of the above method of streaming an event may comprise more than providing computer program code. As illustrated in FIG. 7, an "Aircast Box" can be provided. Once provided, an encoder or encoders of the Aircast Box can be used to convert live video and/or audio feeds (like with the event stream generators 13 of the distributed computer system 10 of FIG. 5) from the event (which as indicated in the figure, is typically a live event). The Aircast Box also enables a server web portal to be provided (for example, by the server 18 of the distributed computer system 10) to the developer of the Client App such that the developer can control the above mentioned Aircast Services (for example, by making program calls provided by way of the SDK) that can be provided to the users of the Client App.

In addition to providing computer program code and the above Aircast box, the method of enabling the device to carry out an embodiment of the above method of streaming an event may also comprise providing other hardware. For example, as illustrated in FIG. 7, additional hardware such as a network switch can be provided on the premises (or "On-Prem") of the event or live event. Such additional hardware can include a wired and/or wireless network distribution system (for example, one including mobile networks such as 5G or future mobile standards) which in turn can comprise wired network components, wireless network components (which may be a local network component such as a wireless local area network (WLAN) access point (AP), a mobile or cellular network component etc.), or both wired and wireless network components. Like with the Aircast mobile application, it is envisaged that streaming or distribution via the Aircast SDK to the Client App may be enabled over a mobile network in lieu of a local network when the local network is not available. Depending on implementation, enablement may be manual or automatic. When used together with the other hardware of FIG. 7, the additional hardware enables a live video and/or audio feed to be streamed from the premises of the event or live event to each user of the Client App via the Aircast SDK embedded in the Client App.

Accordingly, the Aircast SDK can be thought of as a toolkit that can be integrated into a client's or clients' App or Apps (which may be a venue specific App, or a sport specific App) to enable Aircast services, including live video streaming and audio channels to be provided on the App or Apps while other services (data services, advertising etc.) can also be seamlessly streamed to (and so consumed by) each user of the App or Apps while the user is using the App or Apps. Once integrated, the App or Apps can provide a live streaming service that provides each user (for example, a patron of an event) direct access to available content, such as host broadcasts, multiple camera angles, commentary and data, like with the Aircast mobile application.

Below is an overview of some of the elements of the Aircast SDK:

Player
  As indicated above, the Aircast SDK enables a Client App to use a proprietary video/audio player to decode and present streams that are otherwise broadcast only via the Aircast mobile application.
  In one implementation of the Aircast SDK, video controls for the player are all included within the player itself.
Authentication
  In one implementation of the Aircast SDK, authentication for allowing a Client App to access Aircast Services is initiated by the Client App submitting (or transmitting) to an Aircast server or servers (such as the server 18 of the distributed computing system) a request (that is, an authentication request) for a valid key and/or authentication token.
  Upon receiving the valid key and/or the authentication token (that is, post authentication), the Client App is then allowed to initiate one or more application programming interface (API) methods that are available within the Aircast SDK to access one or more Aircast Services (as indicated above) that can be provisioned for the Client App.
SDK Methods
  As indicated above, the Aircast SDK can provide various methods (such as displaying a live player, selection of audio stream, and Multiview) for the Client App to access Aircast Services. It is envisaged that the methods will typically be executed by the Client App. Example of such methods include:
  Video player
  Audio Stream and selection
  Analytics
  Advertising (or Ads)
  Multiview (that is, overlay on video)
  Wagering
Platform
  Depending on implementation, the Aircast SDK can be built to facilitate seamless integration with iOS devices or Android devices. That is, the Aircast SDK can be a platform specific offering.
  In this respect, it is envisaged that the Aircast SDK can also be provided for non-mobile implementations (that is, as a Web SDK).
  Integration documentation can be included as part of the platform
Analytics
  In one implementation of the Aircast SDK, user interactions, datasets and insights can be captured and stored within an Aircast backend platform (such as the database 16 of the distributed computing system 10).
  In one implementation of the Aircast SDK, data can be locally stored by the Aircast SDK in a user device to be synched later (based on internet availability) at an Aircast backend platform.
  In one implementation of the Aircast SDK, analytics and insights of user interactions can be presented to users (or clients) with external access to the Aircast backend platform.
Data
  In one implementation of the Aircast SDK, client data feeds can be integrated to enable presentation of data within a user interface (UI) layer of the Aircast SDK.
  In one implementation of the Aircast SDK, venue and event specific data from an Aircast content management system (CMS) can be accessed and presented (for example, by way of the above mentioned web portal).
UI and Branding
  In one implementation of the Aircast SDK, the Aircast SDK can be implemented such that themes and branding adhere to a Client App
  In one implementation of the Aircast SDK, branding can be switched and updated dynamically.
APIs
  As indicated above, one implementation of the Aircast SDK can be integrated with external systems or external data APIs to facilitate additional features (such as advertising and wagering integration, data overlay, and game and match stats) to further enrich user experience.
Workflow
  Below is a workflow of how an implementation of the Aircast SDK can be used:
  1. First, the platform specific Aircast SDK is provided for integration with (or to be embedded in) to a Client. App.
  2. Once the Aircast SDK is integrated with the Client. App, credentials (for example, a client identifier (ID)) can be assigned to the Client App or a user of the Client App in order for the user of the Client App to access Aircast Services.
  3. The Aircast Services can be accessible (either permanently, or temporarily for a particular session) once the Client App is authenticated via the credentials.
  4. Once the Client App is authenticated, all Aircast. SDK methods, specific to the Client App are made available for use (or consumption) by a user of the Client App.

Further aspects of the method will be apparent from the above description of the system. For example, it will be appreciated that the web portal provided by the server 18 may alternatively be a mobile application (such as a smartphone app). Persons skilled in the art will also appreciate that the method could be embodied in program code. The program code could be supplied in a number of ways, for example on a tangible computer readable medium, such as a disc or a memory (for example, that could replace part of memory) or as a data signal (for example, by transmitting it from a server).

Similarly, it will be appreciated that the data in the database 16 can be supplied on any appropriate tangible data carrier, such as by writing them to a portable device (such as a USB drive), storing them in a memory (including transmitting the data to a device having a memory) etc.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference made herein to prior art is not intended to imply that such prior art forms or formed a part of the common general knowledge in Australia or any other country.

What is claimed is:

1. A method of streaming an event, comprising:
transmitting an event stream identifier to a server for storage in a database;
generating by an event stream generator an event stream that is identifiable by the event stream identifier, wherein the server and the event stream generator are separate devices located in different geographic locations;
requesting the server for the stored event stream identifier by a user;
transmitting the stored event stream identifier and supplementary content from the server over a first communication path to a user device of the user;
over a second communication path, receiving from the event stream generator the event stream generated by the event stream generator using the event stream identifier transmitted from the server to the user device; and
combining the supplementary content transmitted from the server to the user device and the event stream received from the event stream generator, for display to the user of the user device.

2. A method as claimed in claim 1, further comprising authenticating the user device before transmitting the stored event stream identifier and the supplementary content to the user device.

3. A method as claimed in claim 1, further comprising transmitting authentication data to the server in order to enable the server to authenticate the user device.

4. A method as claimed in claim 1, wherein the server is geographically separate from the user device such that the first communication path includes an external network in the form of the Internet between the server and the user device, wherein the event stream generator is geographically local to the user device when compared to the server, such that the second communication path does not include the Internet.

5. A method as claimed in claim 1, further comprising generating another one or more event streams by another one or more respective event stream generators, the event streams bring identifiable by another one or more respective event stream identifiers,
receiving from each of the event stream generators the event stream generated by the event stream generator using the event stream identifier identifying the event stream.

6. A method as claimed in claim 5, wherein the event streams are received by the user device from the event stream generators over different second communication paths.

7. A method as claimed in claim 6, further comprising combining the supplementary content transmitted from the server to the user device and the event streams received from the event stream generators, for display to the user of the user device.

8. A system for streaming an event, comprising:
an event stream generator configured to generate an event stream;
a user device; and
a server, wherein the server and the event stream generator are separate devices located in different geographic locations,
wherein the event stream generator is further configured to transmit to the server an event stream identifier for identifying the event stream;
wherein the server is configured to:
store in a database the event stream identifier transmitted from the event stream generator to the server; and
in response to a request for the event stream identifier by a user, transmit the stored event stream identifier and supplementary content over a first communication path to a user device of the user,
wherein the user device is configured to:
over a second communication path, receive from the event stream generator the event stream generated by the event stream generator using the event stream identifier transmitted from the server to the user device; and
combine the supplementary content transmitted from the server to the user device and the event stream received from the event stream generator, for display to the user of the user device.

9. A system as claimed in claim 8, wherein the server is configured to further configured to authenticate the user device before transmitting the stored event stream identifier and supplementary content to the user device.

10. A system as claimed in claim 8, wherein each user device is configured to transmit authentication data to the server in order to enable the server to authenticate the user device.

11. A system as claimed in claim 8, wherein the server is geographically separate from the user device such that the first communication path includes an external network in the form of the Internet between the server and the user device, wherein the event stream generator is geographically local to the user device when compared to the server, such that the second communication path does not include the Internet.

12. A system as claimed in claim 8, further comprising another one or more event stream generators each of which is configured to generate an event stream, and to transmit to the server an event stream identifier for identifying the event stream,
wherein each user device is configured to receive from each of the event stream generators the event stream generated by the event stream generator using the event stream identifier identifying the event stream.

13. A system as claimed in claim 12, wherein the event streams are received by the user device from the event stream generators over different second communication paths.

14. A system as claimed in claim 13, wherein the user device is configured to combine the supplementary content transmitted from the server to the user device and the event streams received from the event stream generators, for display to the user of the user device.

15. A method of streaming an event, comprising:
requesting a server for an event stream identifier stored in a database, the event stream identifier identifying an event stream generated by an event stream generator, wherein the server and the event stream generator are separate devices located in different geographic locations;

over a first communication path, receiving, by a user device, the stored event stream identifier and supplementary content from the server;

requesting the event stream using the received event stream identifier;

over a second communication path, receiving, by the user device, the event stream from the event stream generator;

combining, by the user device, the received supplementary content and the received event stream; and displaying the combined supplementary content and event stream to a user.

16. A method as claimed in claim 15, further comprising transmitting authentication data to the server in order to enable the server to authenticate the user device.

17. A method as claimed in claim 15, wherein the server is geographically separate from the user device such that the first communication path includes an external network in the form of the Internet between the server and the user device, wherein the event stream generator is geographically local to the user device when compared to the server, such that the second communication path does not include the Internet.

18. A method as claimed in claim 15,
further comprising:
requesting the server for another one or more event stream identifiers stored in the database, the event stream identifiers being for identifying another one or more respective event streams; and receiving, by the user device, the event streams from the event stream generators using the respective event stream identifiers.

19. A method as claimed in claim 18, wherein the event streams are received from the event stream generators over different second communication paths.

20. A method as claimed in claim 19, further comprising combining the supplementary content received from the server and the event streams received from the event stream generators.

* * * * *